(No Model.)
R. J. BAILEY.
HOG TROUGH.
No. 600,763. Patented Mar. 15, 1898.
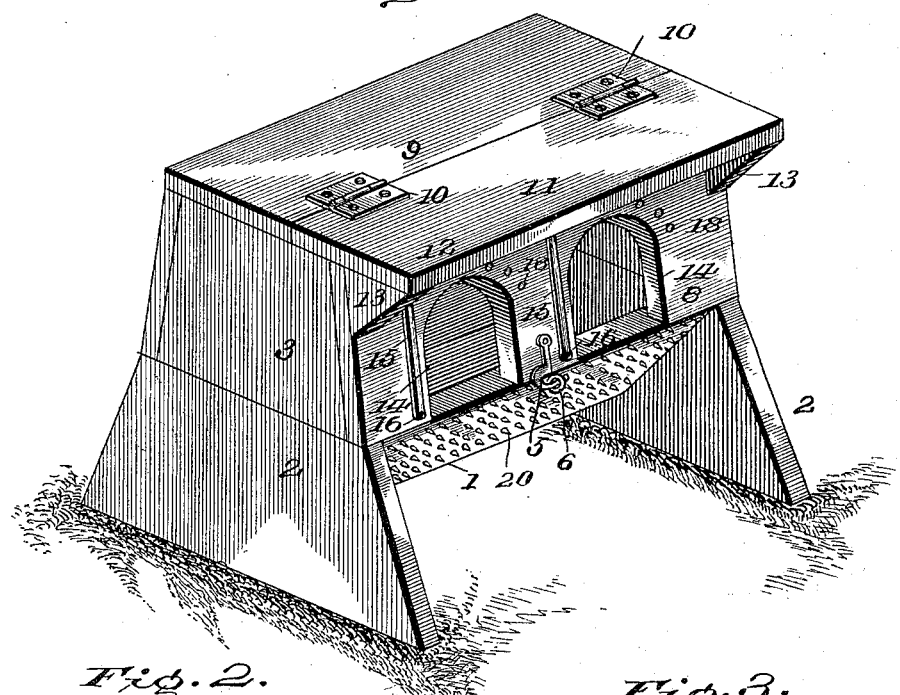
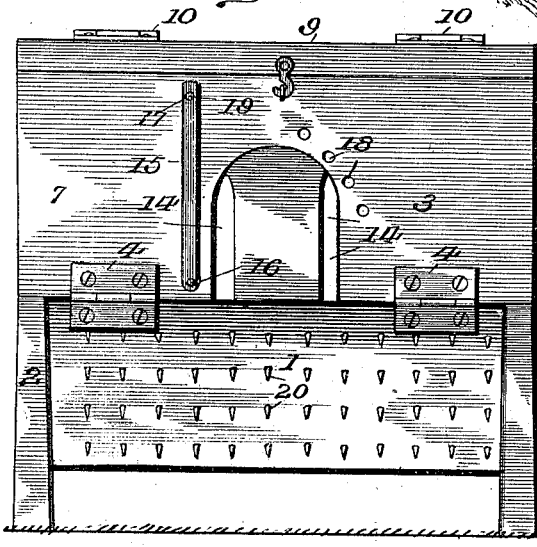
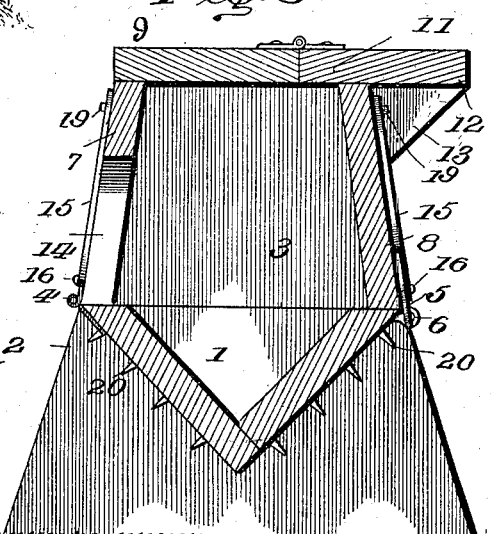
Witnesses
Inventor
Reuben J. Bailey

UNITED STATES PATENT OFFICE.

REUBEN J. BAILEY, OF ESTHERVILLE, IOWA.

HOG-TROUGH.

SPECIFICATION forming part of Letters Patent No. 600,763, dated March 15, 1898.

Application filed July 13, 1897. Serial No. 644,408. (No model.)

*To all whom it may concern:*

Be it known that I, REUBEN J. BAILEY, a citizen of the United States, residing at Estherville, in the county of Emmett and State of Iowa, have invented certain new and useful Improvements in Hog-Troughs; and I do hereby declare the following to be a full, clear, and exact description of the invention, such as will enable others skilled in the art to which it appertains to make and use the same.

My invention relates to a novel form of hog-trough for feeding swine; and the object is to provide a feeding-trough of this class whereby the hogs will be prevented from crowding each other and the larger and stronger animals prevented from having access to apartments intended for the smaller ones.

To these ends the novelty consists in the construction, combination, and arrangement of the same, as will be hereinafter more fully described, and particularly pointed out in the claims.

In the accompanying drawings the same reference characters indicate the same parts of the invention.

Figure 1 is a perspective view of my improved feeding-trough for swine. Fig. 2 is a rear elevation of the same. Fig. 3 is a transverse section.

1 represents the V-shaped trough, the ends 2 2 of which form legs for supporting the same in a horizontal position.

3 represents a rectangular frame, the base of which is of the same size as the top edge of the trough, and it is secured thereto on one side by the hinges 4 4 and on the other by the hook 5 and screw-eye 6, so that when it is necessary to clean the trough the hook 5 may be released from the eye 6 and the frame thrown over to leave the trough exposed, so that convenient access may be had to it for that purpose. The sides 7 and 8 of this hinged frame 3 are preferably converging from the bottom to the top, and the top is closed by a cover 9, secured by the hinges 10 10 to a shelf or table 11, fixed to said frame, its projecting leaf 12 being supported by the angle-brackets 13 13. The sides 7 and 8 are each provided with a series of orifices 14 14, through which the animal may have access to the trough, and each of these orifices is protected by a bar 15, pivoted at its lower end to a bolt 16, fixed in the contiguous side of the frame, while the upper or free end of said bar may be swung across the orifice to diminish its size. By reducing the size of the orifice the larger animals are prevented from having access to the trough and only the smaller ones admitted.

The upper end of the bar 15 is provided with a transverse orifice 17, and 18 18 represent a series of locking-orifices in the side and in line with the orifice in the end of the bar, and by means of the removable pin 19 the bar may be adjusted to diminish the size of the opening.

20 represents a series of spikes or pointed nails projecting from the converging walls of the trough to prevent the animals rooting under and upsetting the trough.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and wish to secure by Letters Patent of the United States, is—

1. A feeding-trough for swine comprising the trough proper, the frame 3 hinged thereto and provided with the orifices 14 14 the shelf or table 11 fixed to the upper end of said frame and the lid or cover 9 hinged to said shelf or table, substantially as shown and described.

2. A feeding-trough for swine comprising the trough proper, the frame 3 hinged to the upper end of said trough and provided with the orifices 14 14, the cover 9 hinged to the upper end of said frame and the pivoted bars 15 arranged to be adjusted across said orifices 14 14, and means substantially as described for adjustably securing said bars in place as and for the purpose set forth.

3. A feeding-trough for swine comprising the trough proper, the frame 3 hinged to said trough and provided with the hinged cover 9 and the orifices 14 14 arranged in the opposite walls of said frame, in combination with a bar 15 pivoted on a bolt 16, and having its upper end provided with an orifice 17 and a removable pin 19 adapted to secure the upper end of said bar in the line with either one of the orifices 18 18, in the contiguous wall of said frame substantially as shown and described.

In testimony whereof I affix my signature in presence of two witnesses.

REUBEN J. BAILEY.

Witnesses:
O. O. REFSELL,
A. J. PENN.